United States Patent
Tang et al.

(10) Patent No.: US 7,924,652 B2
(45) Date of Patent: Apr. 12, 2011

(54) METHOD FOR DETERMINING SEISMIC ANISOTROPY

(75) Inventors: Xiao Ming Tang, Sugar Land, TX (US);
Vladimir Dubinsky, Houston, TX (US);
Yibing Zheng, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 915 days.

(21) Appl. No.: 11/809,384

(22) Filed: Jun. 1, 2007

(65) Prior Publication Data

US 2008/0298174 A1 Dec. 4, 2008

(51) Int. Cl.
*G01V 1/00* (2006.01)
(52) U.S. Cl. .......................................... 367/35
(58) Field of Classification Search .............. 367/25, 367/35, 27
See application file for complete search history.

(56) References Cited

U.S. PATENT DOCUMENTS

| | | | |
|---|---|---|---|
| 3,354,983 A * | 11/1967 | Erickson et al. | 367/140 |
| 4,832,148 A | 5/1989 | Becker et al. | |
| 6,128,580 A * | 10/2000 | Thomsen | 702/18 |
| 7,035,165 B2 | 4/2006 | Tang | |
| 7,310,580 B2 * | 12/2007 | Zhou et al. | 702/6 |
| 2004/0257911 A1 | 12/2004 | Tang et al. | |
| 2006/0291330 A1* | 12/2006 | Siliqi | 367/52 |
| 2007/0097788 A1 | 5/2007 | Tang et al. | |

FOREIGN PATENT DOCUMENTS

WO 2004067912 A1 8/2004

OTHER PUBLICATIONS

International Search Report and Written Opinion dated May 12, 2009, 9 pages.

* cited by examiner

*Primary Examiner* — Jack Keith
*Assistant Examiner* — Krystine Breier
(74) *Attorney, Agent, or Firm* — Bracewell & Giuliani LLP

(57) ABSTRACT

The method disclosed is useful for estimating anisotropic properties of an earth formation. The method includes extracting travel time values of components of the acoustic wave induced from a downhole tool and reflected from a boundary bed formation. The method further includes obtaining a travel time ratio of the wave components and using the travel time ratio to estimate the anisotropic properties of the formation.

12 Claims, 10 Drawing Sheets

METHOD FOR DETERMINING SEISMIC ANISOTROPY

BACKGROUND OF THE INVENTION

1. Field of the Invention

The present invention relates to a method and system of collecting and processing acoustic data. More specifically, the present invention relates to a method for estimating anisotropy of a subterranean formation.

2. Description of Related Art

To obtain hydrocarbons such as oil and gas, boreholes or wellbores are drilled through hydrocarbon-bearing subsurface formations. The drilling of horizontal or deviated wellbores can create some difficulties of downhole imaging due to bed boundaries or dipping beds that are encountered downhole. To overcome this problem three-dimensional borehole profiles have been developed. These three-dimensional borehole profiles can change direction along the way.

A well bore drilled through earth formations encounters various geological structures intersecting the borehole. Borehole acoustic measurements can be used to obtain an image of the formation structural changes away from the borehole provided that the acoustic wave phenomena in the near borehole region are properly understood and utilized. Downhole sensors can be provided with a downhole tool for measuring downhole conditions. The downhole tool can include a sonde insertable within the wellbore as well as any subterranean drilling devices. Also included can be apparatuses for detecting inclination. These measurements are useful to determine hydrocarbons and water presence proximate to the downhole tool.

Subterranean formations are typically not isotropic, i.e. do not exhibit the same properties in all directions. Accordingly these formations are referred to anisotropic. Thus acoustic waves that propagate through the anisotropic formations do not encounter consistent formation properties in all directions. Because of this inconsistency of wave propagation, traditional seismic processing provides limited useful results.

BRIEF SUMMARY OF THE INVENTION

Disclosed herein is a method of analyzing signal data reflected from a bed boundary comprising, obtaining travel time data of a first component of the reflected signal data, obtaining travel time data of a second component of the reflected signal data, taking the ratio of the travel time data of the first and second components, and estimating a formation anisotropic property based on the ratio.

The scope of the present disclosure also includes a method of analyzing a subterranean formation comprising, traversing a downhole tool within a wellbore, wherein the tool comprises a signal transmitter and a reflected signal receiver and wherein a bed boundary is within the subterranean formation, inducing a signal into the formation with the transmitter wherein the signal reflects from the bed boundary to create a reflected signal, recording the reflected signal with the receiver, obtaining travel time information about components of the reflected signal, and estimating anisotropic properties of the subterranean formation based on a ratio of the reflected signal component travel times.

The disclosure scope further includes a system useful for estimating anisotropic properties of a subterranean formation comprising, a signal transmitter, a signal receiver, and a processor configured to extract travel time information of components of reflected signal data received by the signal receiver and further configured to estimate a ratio of the extracted travel time information.

DETAILED DESCRIPTION OF THE INVENTION

Figure 1:
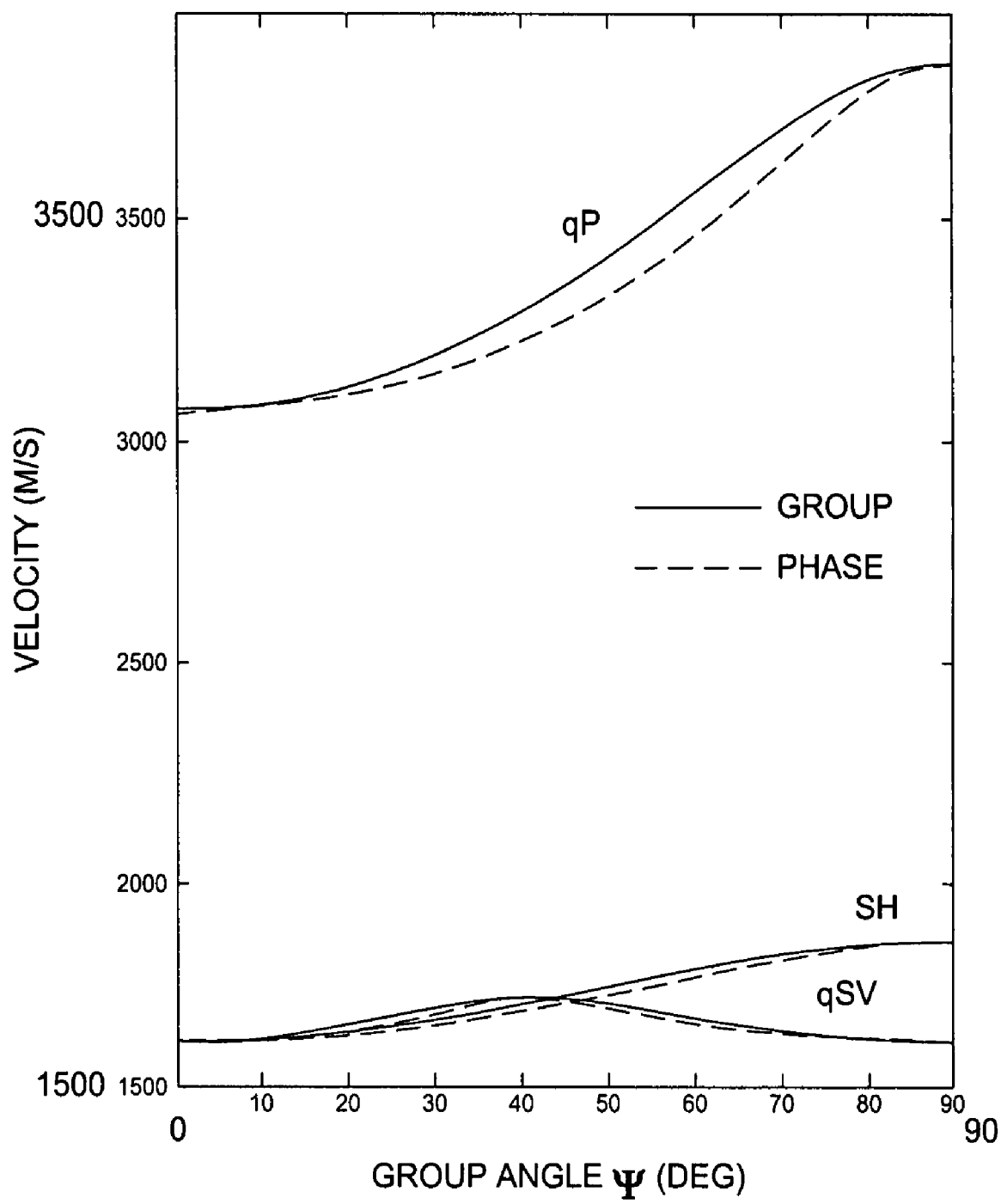
FIG. 1. is a graphical representation of phase and group velocities of wave components as a function of group angle.

Described herein is a method for analyzing acoustic data reflected from an oblique bed boundary. The method measures seismic anisotropy parameters in a borehole that penetrates an anisotropic subterranean formation. The acoustic signal may be produced within a borehole with a downhole tool, such as a four component (4C) acoustic tool (or cross-dipole tool) and the acoustic reflections from the oblique bed boundary may be received and recorded with the same tool.

Seismic Anisotropy Parameters and Wave Velocities—Many earth formations exhibit anisotropic characteristics. The anisotropy is commonly modeled by transverse isotropy (TI). The TI-anisotropy has a symmetry axis such that along any direction transverse to this axis one will see the same material property. Between the symmetry axis direction and the direction perpendicular to it, one will see a material property difference.

Three seismic waves, designated as qP (quasi-P wave), qSV (quasi-S wave polarizing in a vertical plane), and SH (horizontally polarized S wave), can propagate in a TI medium, where the TI symmetry axis is along the z (vertical) direction. The (phase) velocities of these waves are governed by five elastic constants ($c_{11}$, $c_{13}$, $c_{33}$, $c_{44}$, $c_{66}$) of the TI medium (Auld, 1973).

$$V_{qP} = \sqrt{(c_{11}\sin^2\theta + c_{33}\cos^2\theta + c_{44} + \sqrt{D})/2\rho} \quad (1)$$

$$V_{qSV} = \sqrt{(c_{11}\sin^2\theta + c_{33}\cos^2\theta + c_{44} - \sqrt{D})/2\rho}$$

$$V_{sh} = \sqrt{(c_{66}\sin^2\theta + c_{44}\cos^2\theta)/\rho}$$

-continued with:

$$D = [(c_{11} - c_{44})\sin^2\theta + (c_{44} - c_{33})\cos^2\theta]^2 + (c_{13} + c_{44})^2 \sin^2 2\theta \quad (5)$$

where $\rho$ is density and $\theta$ is the angle from the z-axis. The algebraic complexity of the expression D and the numerous elastic constants make it inconvenient to use the anisotropic model in analyzing seismic data. Thomsen (1986) therefore introduced three parameters, known as Thomsen parameters, to recast the formulae into an amenable form.

$$\varepsilon = \frac{c_{11} - c_{33}}{2c_{33}}, \quad (2)$$

$$\delta = \frac{(c_{13} + c_{44})^2 - (c_{33} - c_{44})^2}{2c_{33}(c_{33} - c_{44})},$$

$$\gamma = \frac{c_{66} - c_{44}}{2c_{44}}$$

Using the Thomsen parameters, Chi and Tang (2003) derived the following approximate (for qP and qSV) but sufficiently accurate formulae for the wave velocities.

$$V_{qP} = V_{P0}\sqrt{1 + 2\varepsilon\sin^2\theta - \frac{2(\varepsilon - \delta)\sin^2\theta\cos^2\theta}{1 + 2\varepsilon\sin^2\theta / f}} \quad (3)$$

$$V_{qSV} = V_{S0}\sqrt{1 + \frac{V_{P0}^2}{V_{S0}^2}\frac{2(\varepsilon - \delta)\sin^2\theta\cos^2\theta}{1 + 2\varepsilon\sin^2\theta / f}}$$

$$V_{SH} = V_{S0}\sqrt{1 + 2\gamma\sin^2\theta}$$

where $f = 1 - V_{S0}^2/V_{P0}^2$; $V_{P0} = \sqrt{c_{33}/\rho}$ and $V_{S0} = \sqrt{c_{44}/\rho}$ are respectively the P- and S-wave velocity in the vertical (z-) direction. The parameters $\varepsilon$ and $\gamma$ represent, respectively, P- and S-wave anisotropy between vertical and horizontal directions. Equations (3) indicate that the difference parameter:

$$\eta = \varepsilon - \delta \quad (4)$$

affects the qP and qSV wave propagation characteristics more than the individual parameters $\varepsilon$ and $\delta$. For example, $\eta = 0$ (or $\varepsilon = \delta$) corresponds to an elliptically shaped qP wavefront (also to a circular qSV wavefront), while $\eta < 0$ and $\eta > 0$ correspond, respectively, to positive and negative anellipticity. This difference parameter has been a subject of study (Berryman et al., 1997). It is also an important parameter in seismic processing and inversion (Alkhalifah and Tsvankin, 1995; Tsvankin, 1994; Tsvankin and Thomsen, 1994). Therefore, a goal in the anisotropy measurement is to determine this difference parameter that relates to the P-wave propagation.

Group Angle and Group velocity—seismic energy propagation in an anisotropic medium is along seismic rays. The energy propagation velocity is called group velocity and the angle of a ray (e.g., measured from z-axis) is called group angle or ray angle. Because of anisotropy, the group velocity differs from the phase velocity that is the velocity of the wavefront, and the group angle differs from the phase angle that is the angle of the wavefront normal (Thomsen, 1986). The group angle y and phase angle q are related by the following equation (Berryman, 1979):

$$\tan\psi = \frac{\tan\theta + \frac{1}{v(\theta)} \cdot \frac{dv}{d\theta}}{1 - \tan\theta \cdot \frac{1}{v(\theta)} \cdot \frac{dv}{d\theta}} \quad (5)$$

where v(q) is the phase velocity as a function of q. The group velocity is given by $$v_g(\psi(\theta)) = \sqrt{v^2(\theta) + \left(\frac{dv}{d\theta}\right)^2} \quad (6)$$

Although the phase velocities can be calculated analytically using equations (1) or (3), group velocities must be calculated numerically. For example, for a given y, the phase angle is calculated using equations (3) and (5), which is then used in equation (6) to calculate the group velocity.

FIG. 1 shows an example of group (solid curves) and phase (dashed curves) velocities of qP, qSV, and SH waves as a function of ray (or group) angle for the TI parameters given in Table I. The velocities are calculated using equations (3) in connection with equations (5) and (6) The qP and SH velocities increase monotonically from 0° to 90° and the qSV velocities tend to peak at about 45°, exhibiting different angle dependences. In all cases, the group velocity is greater than the phase velocity, as is mathematically implied by equation (6)

TABLE I

TI formation anisotropy parameters used in theoretical modeling.

| $\epsilon$ | $\delta$ | $\gamma$ | $\eta = \epsilon - \delta$ | $V_{P0}$ (m/s) | $V_{S0}$ (m/s) |
|---|---|---|---|---|---|
| 0.287 | 0.187 | 0.15 | 0.1 | 3100 | 1600 |

In the case of weak anisotropy where $\epsilon, \delta, \gamma \ll 1$, the group and phase velocities have simple (and similar) analytical expressions, as can be directly derived from equations (3) (see also Thomsen, 1986).

Phase: (7)

$$\begin{cases} V_{qP}^p(\theta) = V_{P0}(1 + \delta\sin^2\theta + \eta\sin^4\theta) \\ V_{qSV}^p(\theta) = V_{S0}\left(1 + \frac{V_{p0}^2}{V_{s0}^2}\eta\sin^2\theta\cos^2\theta\right) \\ V_{SH}^p(\theta) = V_{S0}(1 + \gamma\sin^2\theta) \end{cases}$$

Group:

$$\begin{cases} V_{qP}^g(\psi) = V_{P0}(1 + \delta\sin^2\psi + \eta\sin^4\psi) \\ V_{qSV}^g(\psi) = V_{S0}\left(1 + \frac{V_{p0}^2}{V_{s0}^2}\eta\sin^2\psi\cos^2\psi\right) \\ V_{SH}^g(\psi) = V_{S0}(1 + \gamma\sin^2\psi) \end{cases}$$

where the superscripts p and g denote phase and group velocities, respectively. With the above description of the anisotropy parameters, we now discuss how borehole acoustic measurements can be used to determine them.

Current borehole acoustic logging can only measure the shear-wave anisotropy parameter $\gamma$. In a vertical well penetrating a VTI formation (symmetry axis is vertical), the borehole Stoneley wave is sensitive to the SH wave velocity and can be used in connection with the measured vertical shear velocity ($V_{SO}$) along borehole to determine γ (Tang, 2003). In the case where the TI symmetry axis is perpendicular to borehole, cross-dipole logging can be used to directly measure the γ parameter. (This scenario of anisotropy is often associated with vertical fractures or unbalanced stresses; see Tang and Patterson (2000)).

Acoustic Reflection Profiling—This method utilizes the reflections from near-borehole bed boundaries to estimate the P-wave related anisotropy parameter(s). The major requirement is that the bed must be at an inclined angle with the borehole. Data required for using this analysis method are routinely acquired in acoustic logging services.

Figure 2:
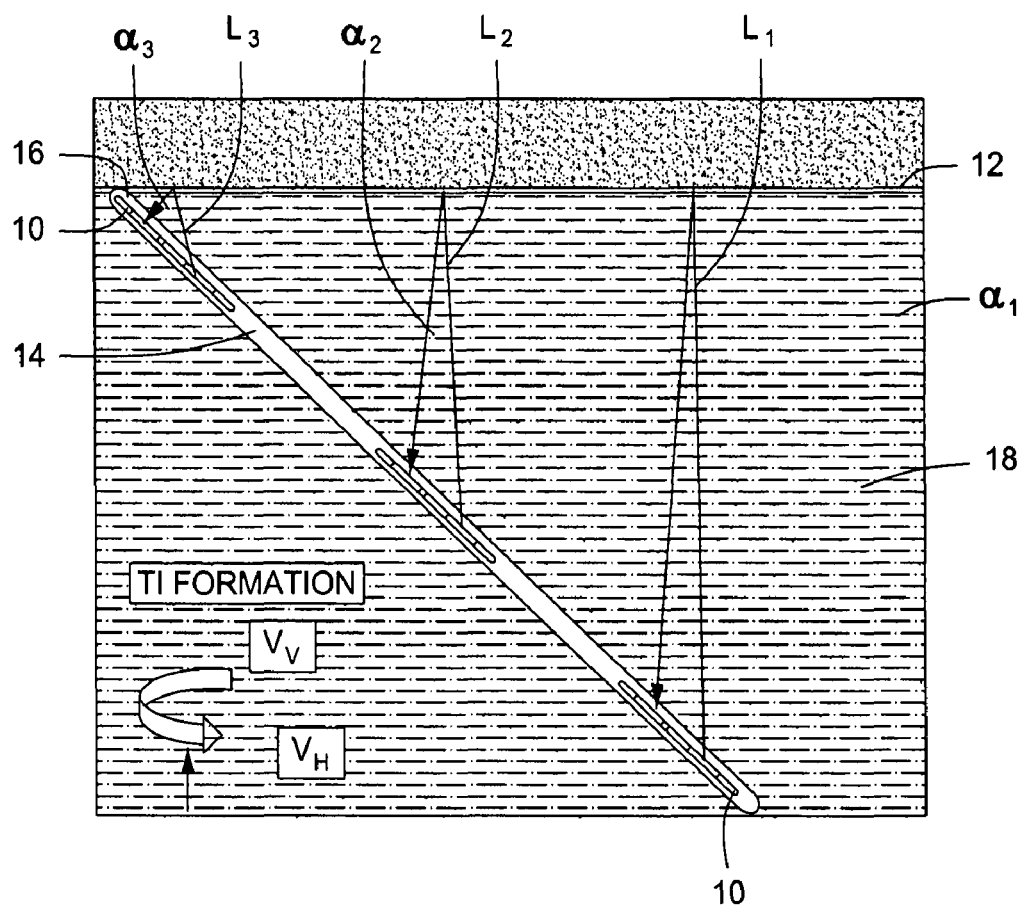
FIG. 2 is a conceptual model of operation of a downhole tool within a subterranean formation having a bed boundary.

Operation Principle of the Method—FIG. 2 depicts in a side cutaway view the logging of a wireline acoustic tool 10 in the vicinity of a bed boundary 12 intersecting the borehole 14 at an oblique angle. The tool 10 includes an acoustic transmitter for creating acoustic waves and a receiver array for receiving reflected waves. However the acoustic data analyzed by the method described herein is not limited to the tool embodiment of FIG. 2 but includes any tool or method of collecting acoustic data. As the acoustic source on the tool 10 is energized, the acoustic energy strikes the bed boundary 12 and reflects back to the receiver array. The acoustic energy, or waves, are represented by a series of lines (L1, L2, L3). In the example provided, the angle of acoustic incidence (α1, α2, α3) onto the bed boundary 12 gradually increases as the tool approaches the borehole-bed intersection 16, enabling the wave to probe/profile the formation in a range of directions. This directional profiling provides the needed anisotropy information.

Figure 3:
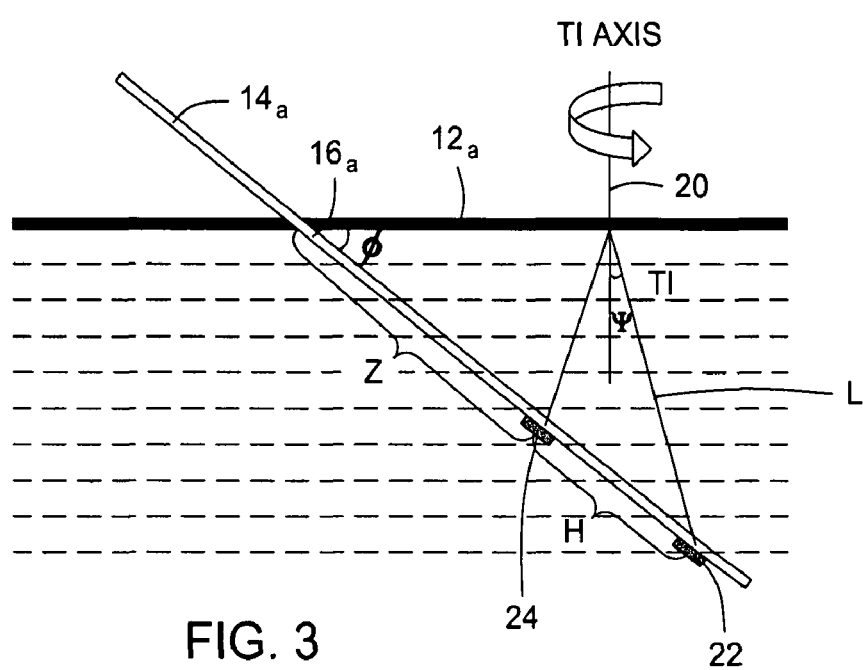
FIG. 3 is a schematic representation illustrating reflection profiling.

FIG. 3 provides a schematic representation of a tool having an acoustic source 22 and an acoustic receiver 24 disposed within a wellbore 14a. A line L is provided indicating an acoustic signal travel path from the source 22, reflecting from a bed boundary 12a, and being received and recorded by a receiver 24. For the following anisotropy analyses it is assumed the formation has TI anisotropy along and normal to the bedding plane, with the symmetry axis (also referred to herein as the TI axis) normal to the bedding plane. This also implies that the formation properties do not change along the bedding plane. As a result, the angle of incidence equals the angle of reflection for an acoustic ray striking the bed boundary. This angle, denoted by ψ, is related to the bed intersection angle φ through the following equation that can be easily derived using the geometry/configuration of the borehole and tool relative to the bed boundary.

$$\tan\psi = \left(\frac{H}{2Z+H}\right) / \tan\phi \quad (9)$$

where Z is the receiver distance to the borehole-bed intersection 16a and H is the source-receiver spacing.

Equation (9) specifies the angle range covered by the acoustic reflection profiling. At large distances from the intersection (Z→∞), ψ~0, the wave's incidence is almost normal to the bed; close to the intersection point (Z→0), ψ~90°−φ, the wave's incidence to the bed 12a is at the complementary angle of φ. Thus the angular range of the profiling is:

$$0<\psi<90°-\phi$$

For a vertical borehole crossing dipping beds, the complementary angle of φ is simply the bed dip; for an anisotropic formation, the incident/reflection angle ψ of the acoustic ray path should be the group angle measured from the bed normal direction and the propagation of qP, qSV, and SH waves are at their respective group velocity.

With the group angle given by equation (9), the reflection travel time from the source to receiver along the ray path may be written:

$$TT = \frac{d}{v_g(\psi)} = \frac{\sqrt{H^2 + 4Z(Z+H)\sin^2\phi}}{v_g(\psi)} \quad (10)$$

where d is the wave travel distance in the formation. Using the respective group velocity $v_g(V)$ for qP, qSV, and SH waves (e.g., equations (3)-(6)), the above equation can be used to calculate the travel time for any of the three waves. The travel distance d and the incident angle ψ are common for all three waves.

Figure 4:
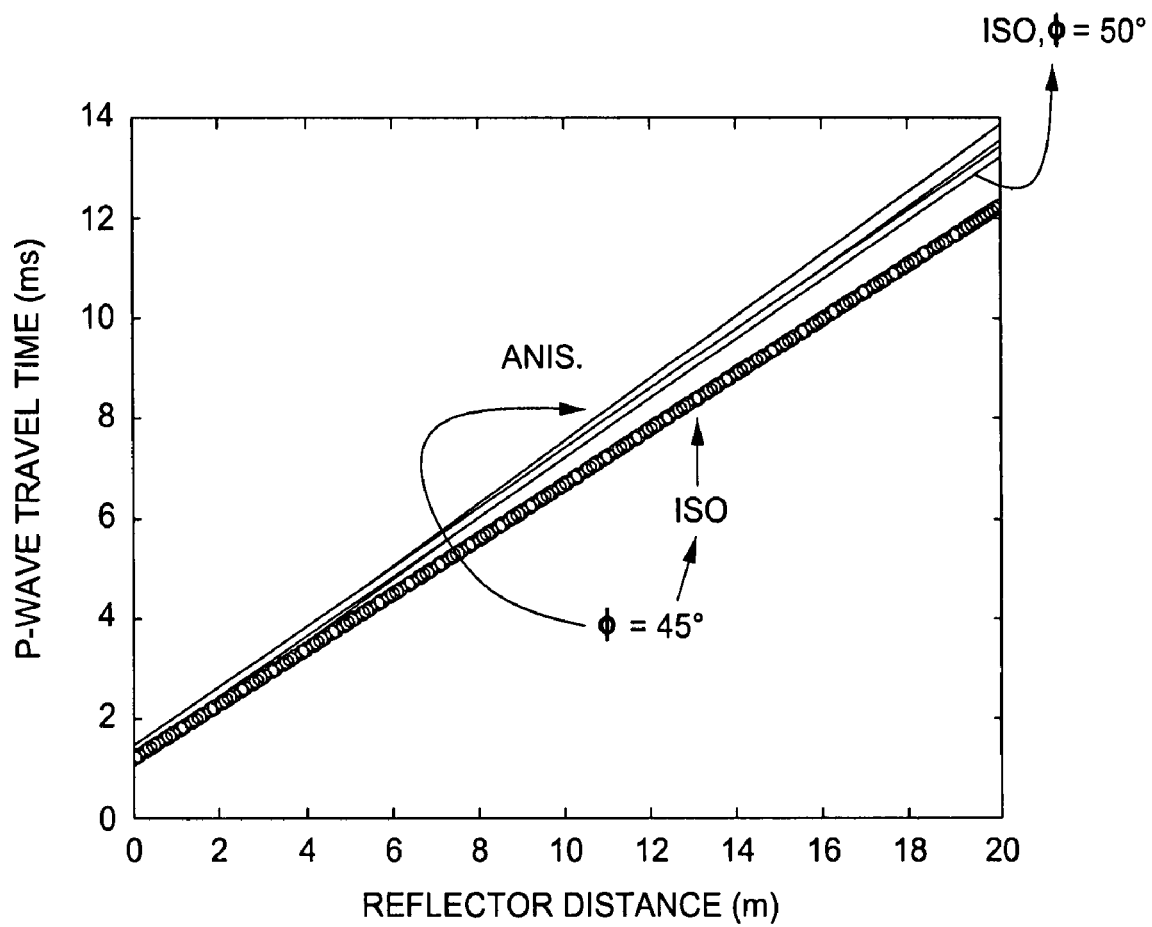
FIG. 4 graphically illustrates wave reflection data as a function of tool to reflector distance.

In an anisotropic formation, the velocity $v_g(\psi)$ varies with ψ, the travel time TT will then be sensitive to formation anisotropy. FIG. 4 is a graphical representation of a P-wave reflection travel time as a function of the logging distance Z. The data used in creating FIG. 4 included the formation anisotropy parameters of Table I with an intersection angle of 45° and source-to-receiver spacing H of 3.66 m. For comparison, an isotropic travel time curve (dashed) was also calculated and provided in FIG. 4, $v_g(\psi)$ was held constant to be the velocity measured along borehole in the isotropic travel time curve. Because of anisotropy, $v_g(\psi)$ decreases as ψ decreases with increasing Z (see FIG. 1). Consequently, the anisotropic TT is delayed relative to its "isotropic" counterpart, indicating its sensitivity to formation an isotropy.

Using TT directly for anisotropy estimation, however, suffers a drawback in practice simply because the dominant influence of the travel-distance d, which is largely controlled by the bed intersection angle φ. Even a small uncertainty in φ will obscure the anisotropy signature. For example, the "isotropic" TT calculated with φ=50° almost overlays with the anisotropy TT curve (see FIG. 4). This shows that an uncertain φ, and hence d, will cause large errors in the anisotropy estimation from travel time TT.

Using travel time ratio of the various waves can overcome the above drawback. By taking the ratio of SH to qSV and of SH to qP, the travel time ratio reduces to velocity ratio.

$$\frac{TT_{SH}}{TT_{qSV}} = \frac{V^g_{qSV}}{V^g_{SH}}; \quad \frac{TT_{SH}}{TT_{qP}} = \frac{V^g_{qP}}{V^g_{SH}} \quad (11)$$

where the various group velocities are given by equations (3)-(6). For weak anisotropy and small ψ (e.g., low-dip beds cross a vertical well) situations, equations (7) can be used to reduce equations (11) to simple analytical expressions $$\frac{TT_{SH}}{TT_{qSV}} \sim 1 + \left(\frac{V^2_{P0}}{V^2_{S0}}\eta - \gamma\right)\sin^2\psi;$$

$$\frac{TT_{SH}}{TT_{qP}} \sim \frac{V_{P0}}{V_{S0}}(1+(\delta-\gamma)\sin^2\psi)(\delta, \eta, \gamma, \sin^4\psi \ll 1) \quad (12)$$

By measuring $V_{P0}/V_{S0}$ and γ along borehole, equations (12) provide a simple method for estimating the anisotropy parameters η and δ. Specifically, the travel time ratios can be linearly fitted to $\sin^2\psi$ and the parameters can be obtained from the slope of the fitted line. The velocity ratio $V_{P0}/V_{S0}$, although defined as the value along the TI symmetry axis, can be well approximated by the measured value along borehole.

$$\frac{V_{P0}}{V_{S0}} \cong \frac{V_P}{V_S} \text{(along borehole)}$$

As mentioned before, γ can be estimated from borehole Stoneley waves when the intersection angle φ is close to 90°. When this angle effect cannot be neglected, the anisotropy values from the Stoneley (denoted by anist) and cross-dipole (anixd) measurements can be combined to estimate γ (Chi and Tang, 2003).

$$\gamma = \frac{anist \cdot \cos^2\phi + anixd \cdot (\sin^2\phi/8 - \cos^2\phi)}{(1+2 \cdot anixd)\cos^4\phi - (1+2 \cdot anist)\cos^2\phi \sin^2\phi + \sin^4\phi/8} \quad (13)$$

For strong anisotropy and large angular range of ψ, the group velocities should be evaluated using the more accurate expressions in equations (3)-(6). In any case, specifying the values of $V_{P0}/V_{S0}$ and γ helps constrain the anisotropy parameter estimation.

Reflection Processing: Extracting qSV and SH Reflections from Cross-dipole Data—This method includes the added step of extracting the reflection waves from acoustic logging data. One method of signal processing for extracting reflections from array acoustic data and using them to image near-borehole bed boundaries can be found in application having Ser. No. 11/342,145 filed on Jan. 27, 2006. This reference is hereby incorporated by reference herein in its entirety.

Figure 5:
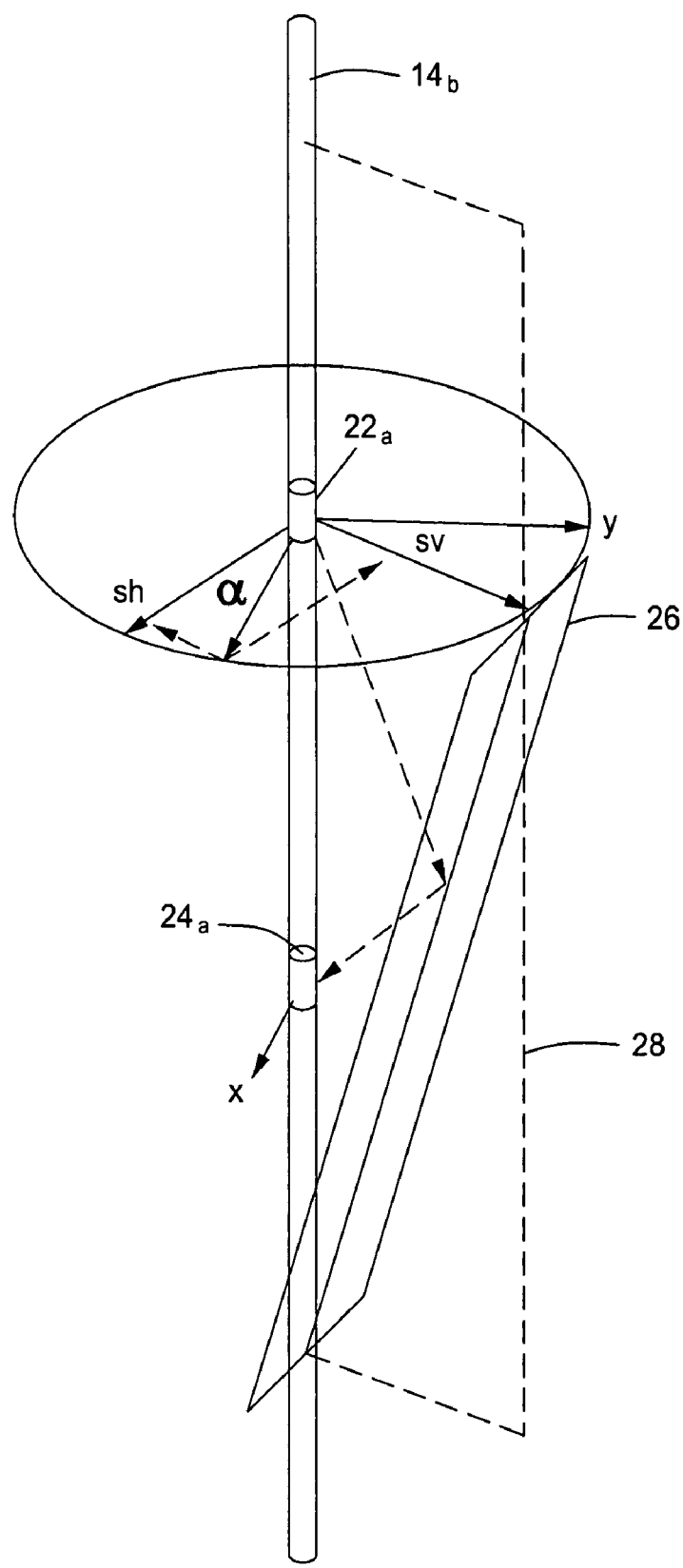
FIG. 5 illustrates acquisition of wave component reflections from an inclined bedding plane.

With reference now to FIG. 5 a schematic view of a transmitter emitting an acoustic signal is provided. In this view, a shear wave is emitted from a borehole dipole source in conjunction with an inclined bed boundary plane crossing the borehole. The shear wave ray path is represented by line L. For the entire bed plane 26, reflection occurs only in the wave incident plane 28 containing the borehole and the bed dip direction. The x-dipole source is oriented along the x-axis of the rectangular coordinate system on the tool and makes an angle of a with the normal of the incident plane 28. For a plane containing the x- and y-axes at the source, the respective projections of the x-dipole to the normal of the incident plane 28 and to the plane itself are labeled as sh and sv, respectively.

$$sh = S \cdot \cos \alpha; \quad sv = S \cdot \sin \alpha \quad (14)$$

where S is the source strength. The sh component, being transverse to the incident plane 28, generates a SH wave to strike the bed 26, while the sv component, being contained in the plane, emits a qSV wave toward the bed 26. As indicated by equation (9) that specifies the wave incident angle, the SH and qSV waves follow the same ray path L from the source to the reflector, and back to the receiver in borehole.

Now consider recording the reflected waves with the x and y dipole receivers. After reflection from the reflector, the reflected SH and qSV waves, (written as $SH = T_{SH}S$ and $qSV = T_{SV}S$, where $T_{SH}$ and $T_{SV}$ are respectively a transfer function for the two waves), are projected onto the receivers to give the XX and XY component data.

$$XX = SH \cdot \cos^2\alpha + qSV \cdot \sin^2\alpha; \quad XY = -SH \cdot \sin\alpha \cos\alpha + qSV \cdot \sin\alpha \cos\alpha \quad (15)$$

Note the recorded SH and qSV waves in the above equation contain, respectively, the combined effect of source excitation (equations (14)), source radiation and receiver reception directivity, bed-boundary reflection, and propagation, etc., in the incident plane. These effects are different for SH and qSV waves. For example, the reflection coefficients at the bed reflector are different for the two waves (Aki and Richards, 1980). Equations (14) and (15) pertain only to the projection within the tool frame coordinates x and y. Performing the same analysis for the y-dipole source of the same intensity S, the YX and YY component data may be determined:

$$YX = -SH \cdot \sin\alpha \cos\alpha + qSV \cdot \sin\alpha \cos\alpha; \quad YY = SH \cdot \sin^2\alpha + qSV \cdot \cos^2\alpha \quad (16)$$

Combining the four-component cross-dipole data, the desired SH and qSV reflection waves may be obtained.

$$SH = XX \cdot \cos^2\alpha + (XY + YX) \cdot \sin\alpha \cos\alpha + YY \cdot \sin^2\alpha$$

$$qSV = XX \cdot \sin^2\alpha - (XY + YX) \cdot \sin\alpha \cos\alpha + YY \cdot \cos^2\alpha \quad (17)$$

The angle α needed for calculating the reflection waves are provided by the cross-dipole anisotropy inversion analysis (Tang and Chunduru, 1999). The analysis finds the angle between the x-axis of the tool and the fast shear polarization direction. For a TI formation with its symmetry axis tilted from the borehole (as in FIG. 3), the fast shear wave along borehole is either a SH- or a qSV-type of wave, depending on formation anisotropy parameters and the tilt angle of the symmetry axis (i.e., φ) (see Tang and Patterson, 2005). Thus the SH and qSV reflections are already contained in the fast and slow shear wave data calculated by the analysis.

The fast and slow shear wave data, however, consist primarily of the waves traveling directly along borehole, which must be removed to extract the desired reflections of much smaller amplitude. For this purpose, the above-mentioned signal processing method (found in Ser. No. 11/342,145) can be applied to the fast and slow wave data to respectively obtain the SH and qSV reflections.

Practical Implementation of the Method in Data Processing—The procedure and result of the acoustic reflection profiling method can be effectively demonstrated by implementing it to field data processing. The field data example used here is for a vertical well through a sand-shale formation in the Gulf of Mexico.

Figure 6:
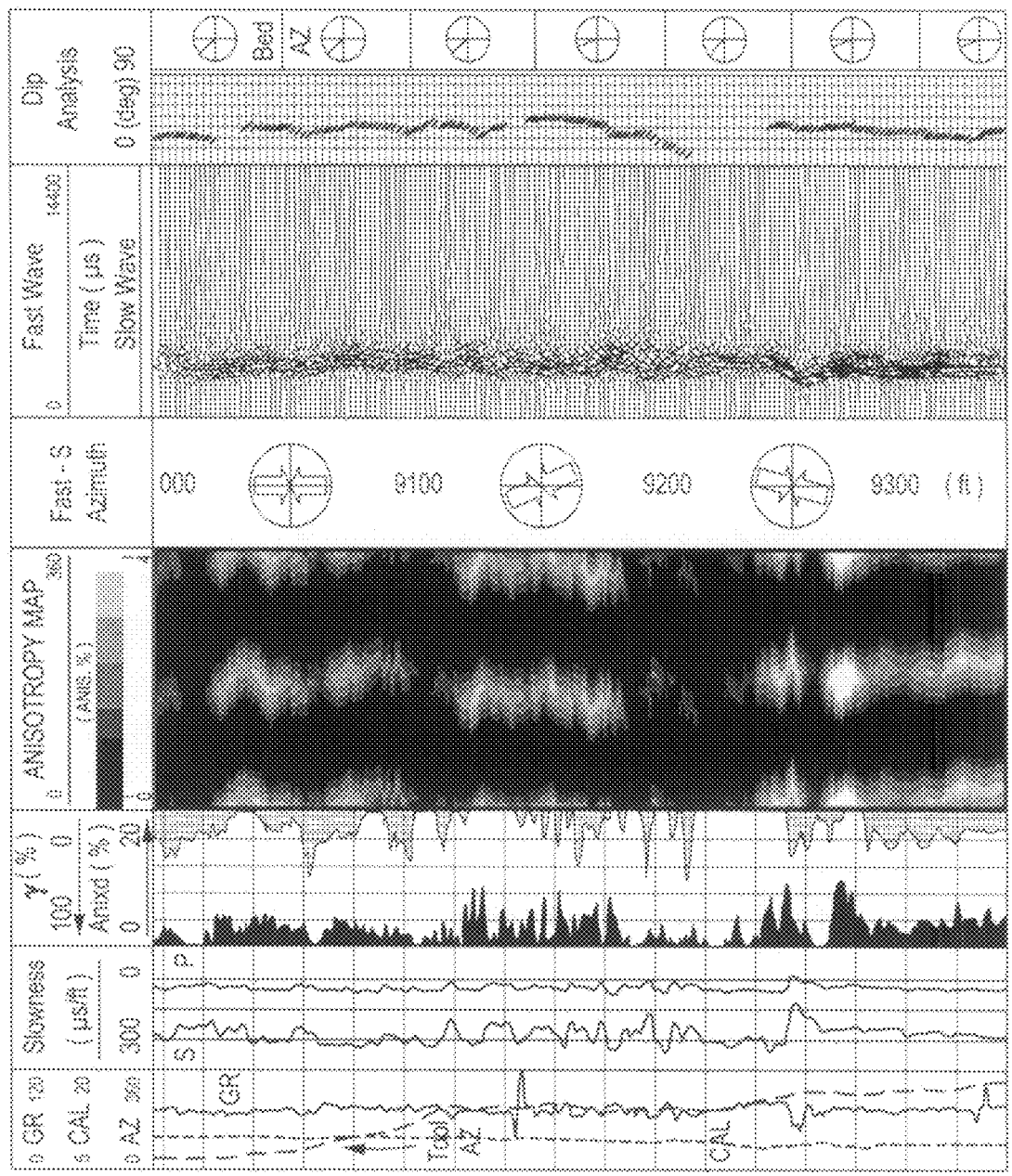
FIG. 6 depicts acoustic and other log data for demonstrating the reflection profiling method.

FIG. 6 shows the acoustic data and associated log curves for demonstrating the method. Track 1 displays the log curves of gamma ray, caliper and the dipole azimuth of the acoustic tool. Track 2 shows the P and S wave slowness curves. The two anisotropy log curves shown in track 3 indicate that the formation has anisotropy. The anisotropy parameter γ-log curve is the shaded curve plotted from right (0) to left (100%), which is obtained from inverting the Stoneley wave data (Tang, 2003). The cross-dipole anisotropy (anixd) analysis result indicates small (average 2-3%) but persistent anisotropy (plotted from left (0) to right (20%)) in this formation. The anisotropy and its azimuth are displayed in the (VDL) anisotropy map of track 4. Dip analysis results are displayed in the last track, showing that the average dip of the formation beds is about 30°, dipping toward the NNW direction. The dip analysis result is used to determine the fast/slow shear wave polarization.

The rose diagram in track 5 indicates that the average fast shear polarization is approximately aligned to the formation dip direction. This direction, according to FIG. 5, should be in the incident plane containing the qSV wave polarization. It is thus determined that the qSV reflection is contained in the fast shear data while the SH reflection is in the slow shear data. The fast and slow data across the formation interval are shown in track 6, from which the SH and qSV reflections will be extracted.

Figure 7:
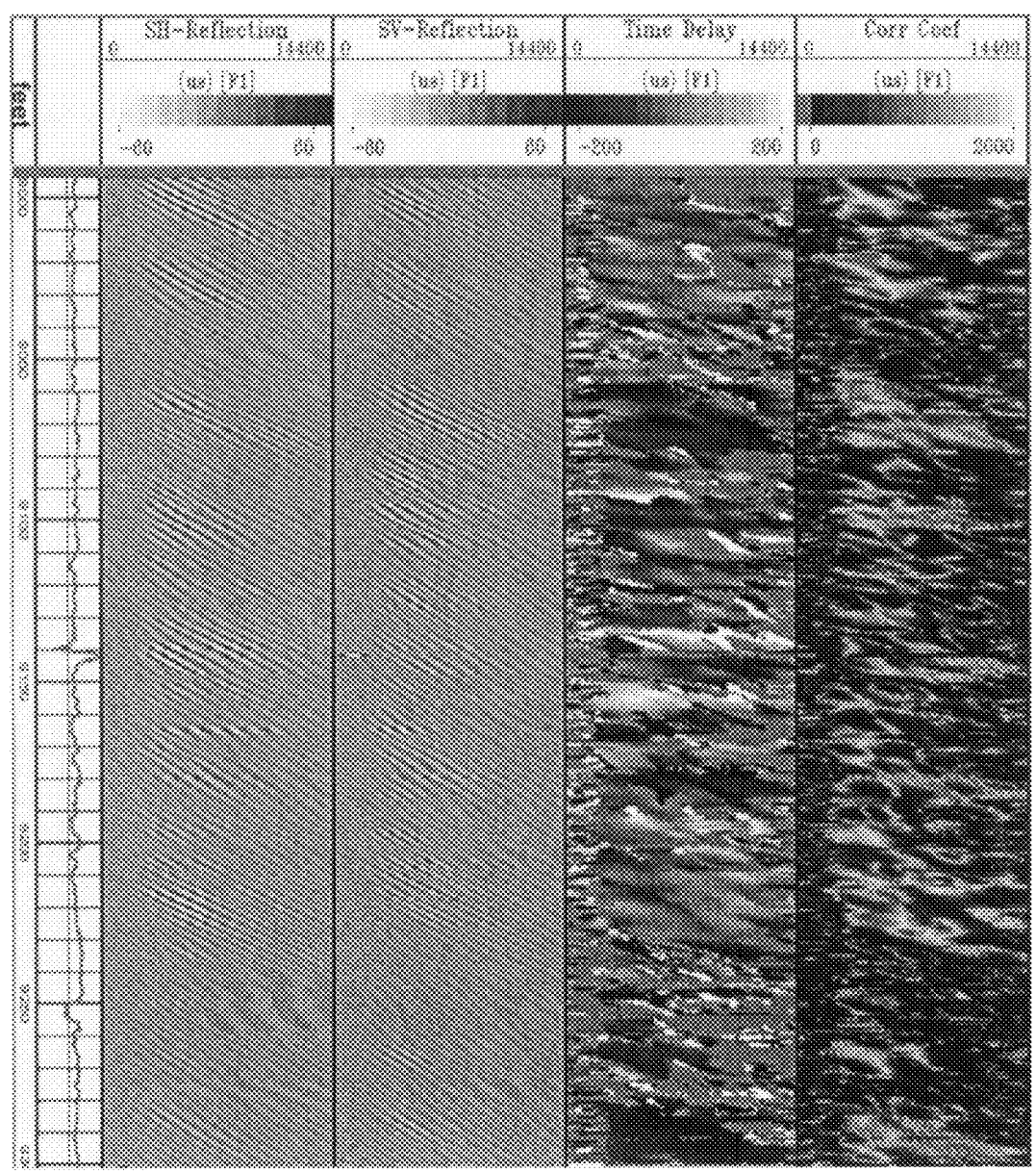
FIG. 7 portrays log data used for estimating an average anisotropy using depth averaging.
Figure 8:
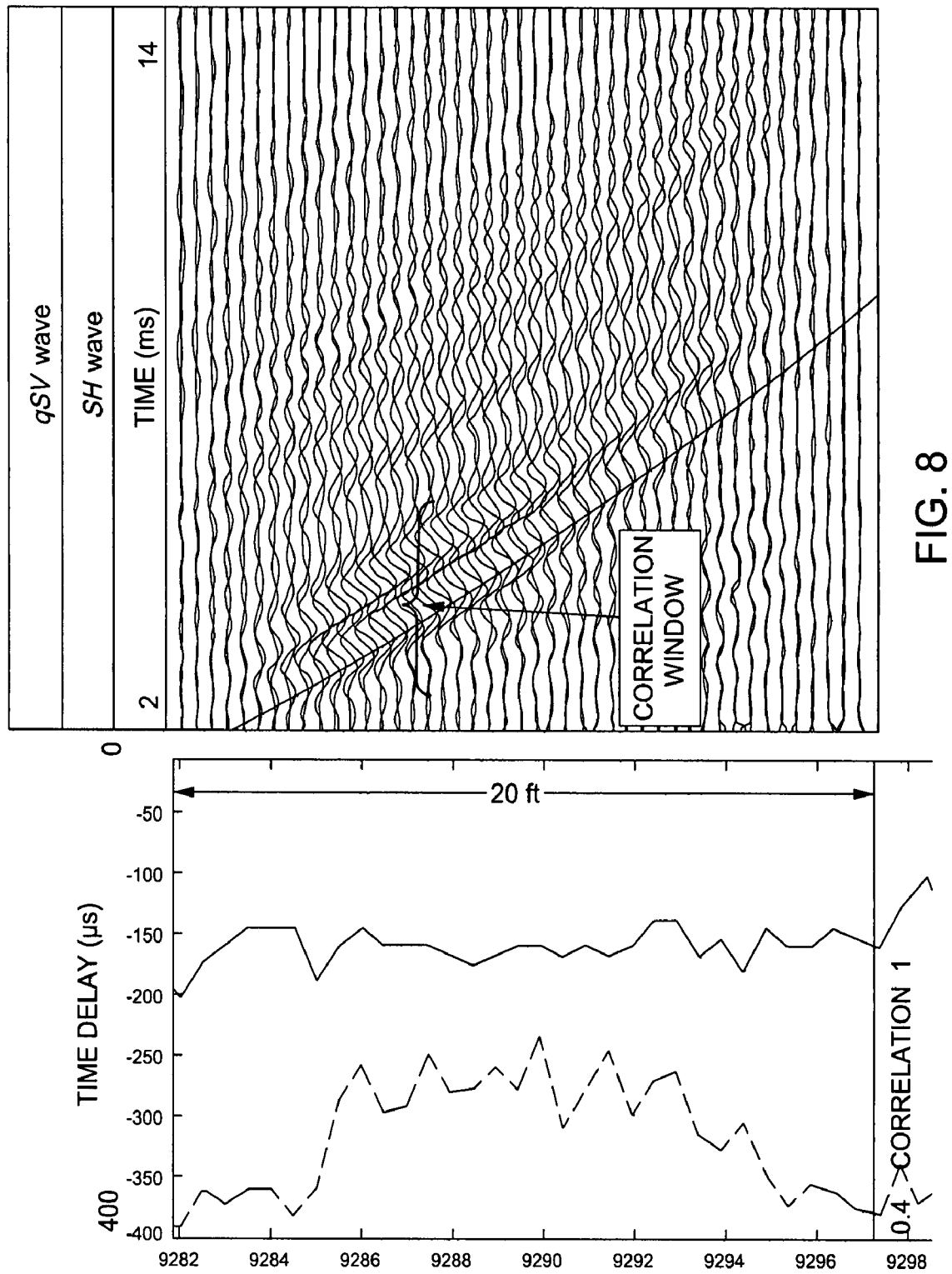
FIG. 8 is an example of process component wave reflections.

Using travel time of individual reflection events—Processing the fast shear data using the signal processing method found in the above referenced Ser. No. 11/342,145 obtains the qSV reflection waves (FIG. 7, track 3). As shown in this figure, a number of reflection events are clearly identified. The event around 9280 ft at the bottom of FIG. 7 was selected to demonstrate the analysis. The detailed reflection wave characteristic and its moveout from this depth are shown in FIG. 8. Data processing may be employed to pick its arrival time, as indicated by a curve tracking the event. In fact, this travel time curve can be used with equation (10) to estimate the bed intersection angle $\phi$, as $$(TT \cdot v)^2 - H^2 = 4Z(Z+H) \cdot \sin^2 \phi \quad (18)$$

Using the (average) shear velocity $v$ over the event duration distance $Z$, the $(vTT)^2-H^2$ data is linearly fitted to $4Z(Z+H)$, and the angle $\phi$ is estimated from the slope of the fitted line. This angle estimation example is demonstrated in FIG. 9, using the TT data on FIG. 8. The estimated angle is about 60° and the bed dip angle (90°−$\phi$) is therefore 30°, in close agreement with the dip log shown in FIG. 8. Alternatively, the angle can be estimated from the image of the reflectors obtained by migrating the reflection(s) from time to (radial) depth domain.

Figure 9:
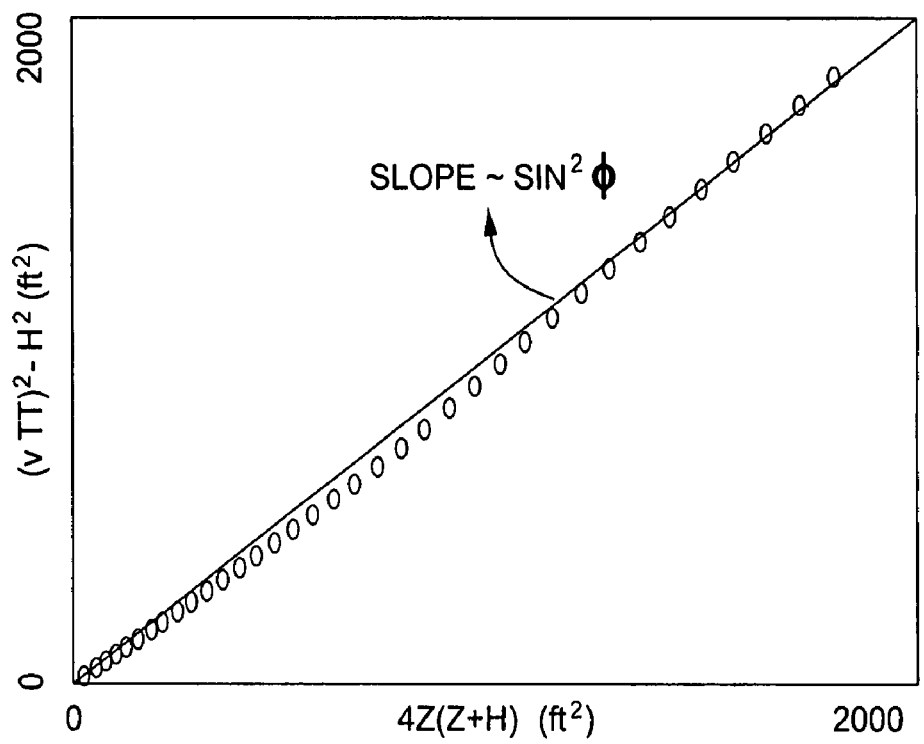
FIG. 9 graphically represents a bed-intersection angle using a linear fitting method.

Processing the slow shear wave data using the same signal processing method obtains the SH reflections. FIG. 9 overlays the SH and qSV reflection waves for the depth around 9280 ft. There is a slight time delay of SH wave relative to the qSV wave, showing the effect of anisotropy on the reflections. The time lag or difference between the two reflection waves can be effectively calculated using the cross-correlation between the two waves.

$$XCOR(\tau) = \frac{\int_{TW} SH(t) \cdot qSV(t+\tau) dt}{\sqrt{\int_{TW}(SH(t))^2 dt \cdot \int_{TW}(qSV(t))^2 dt}} \quad (19)$$

The time window TW, about 1-2 wavelengths long, is along the reflection travel time TT (see FIG. 8). The time difference $\Delta T$ is the value of $\tau$ (denoted by $\tau_{max}$) that maximizes the above cross-correlation function, this maximum value being the cross-correlation coefficient XCOEF.

$$XCOEF = XCOR(\tau_{max}); \Delta T = \tau_{max} \quad (20)$$

The $\Delta T$ and XCOEF data are shown in the left plot of FIG. 8. $\Delta T$ provides a measure of the anisotropy effect and XCOEF indicates the data quality and the similarity of the waves. The time difference, plus the travel time curve (e.g., the TT curve in FIG. 8), gives the travel time ratio of SH to qSV waves.

$$\frac{TT_{SH}}{TT_{qSV}} = \frac{TT_{qSV} + \Delta T}{TT_{qSV}} \cong 1 + \frac{\Delta T}{TT_{qSV}} \quad (21)$$

The cross-over of the reflection travel time with the shear travel time along borehole defines bed intersection point. From this point the tool distance $Z$ from the reflector is measured. The distance and the estimated bed angle $\phi$ are then used in equation (9) to calculate the wave incident angle $\psi$. Using equation (12), the reflection travel-time ratio is linearly fitted versus $\sin^2 \psi$. From the slope of the fitted line, the important anisotropy parameter $\eta$ is calculated using $$\eta = \frac{V_S^2}{V_P^2}(\gamma + \text{line slope}) \quad (22)$$

Figure 10:
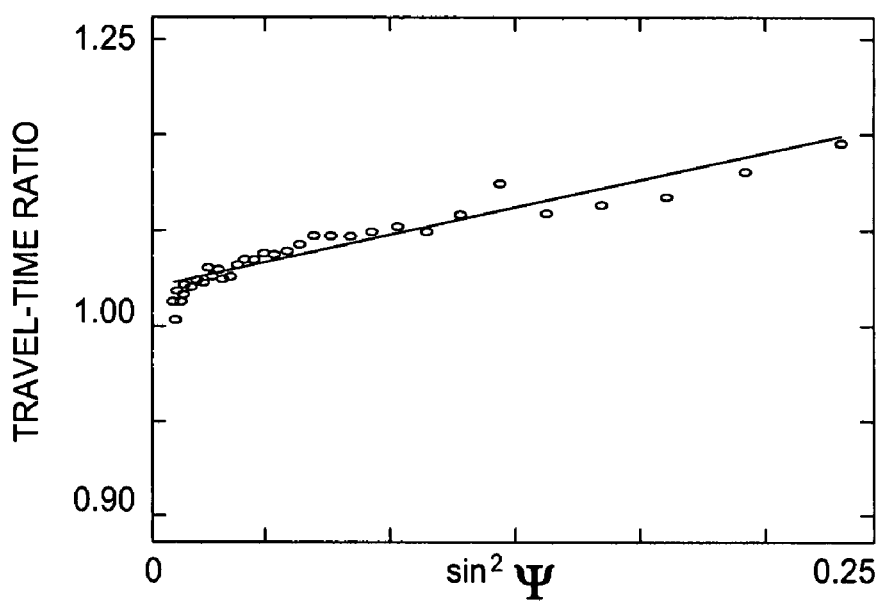
FIG. 10 illustrates in graphical form an anisotropy estimation by linear fitting of the SH-to-qSV reflection travel time ratio versus $\sin^2 \psi$.

FIG. 10 shows the ratio data versus $\sin^2 \psi$, which exhibits a linear trend as predicted by equation (12). The line fitted to the data gives a slope of 0.31. The average $\gamma$ is 0.19 and P-to-S velocity ratio is 2.07. This gives a $\eta$ value of 0.12. The example in FIG. 1, which is calculated with similar values of $\gamma$ and $\eta$, shows that qSV is faster than SH around $\psi=30°$, consistent with the field measurement scenario.

Using average SH and qSV reflection time difference—Analyzing individual reflections to obtain anisotropy estimates is tedious and time consuming. In seismic interpretation, the interpreter often needs only an average anisotropy property over a large formation block, instead of the anisotropy of individual formation layers. Therefore optionally, to obtain the anisotropy property over a large formation interval, the SH and qSV reflection time difference can be averated over the interval to obtain an average estimate of anisotropy. For this averaging, it may be assumed that the intersection angles of the beds in the formation interval of interest does not vary significantly.

To get the time difference average, for each depth a calculation is performed for the cross-correlation function of equation (19) by stepping the correlation time window TW through the entire wave recording time. The SH and qSV time difference and their correlation coefficient are then a two-dimensional function of Z (tool position or depth) and t (time). The averaging of the time difference is weighted by the correlation coefficient.

$$\langle \Delta T \rangle(t) = \frac{\int_{\Delta Z} \Delta T(t, Z) \cdot XCOEF(t, Z) dZ}{\int_{\Delta Z} XCOEF(t, Z) dZ} \quad (23)$$

where $\Delta Z$ is the formation interval for the averaging. Weighting $\Delta T$ by XCOEF for each depth $Z$ is based on the fact the coefficient is large only at depths where the reflections are present, such that the depths without reflections will not contribute to the calculation.

After the depth averaging, the average time difference $\langle \Delta T \rangle(t)$ becomes a function of time $t$ only. Assuming an invariant $\phi$ for all the beds in $\Delta Z$, the time $t$ may be regarded as the reflection travel time TT (i.e., t→TT) in equation (18) and use this equation to get an equivalent reflector distance $Z$ for a reflection arriving at $t$.

$$Z = 0.5 \cdot (\sqrt{(v \cdot t)^2 - (H \cdot \cos\phi)^2}/\sin\phi - H) \quad (24)$$

where $v$ is the average shear velocity in $\Delta Z$. The distance $Z$ is then used in equation (9) to compute the incident angle $\psi$. Finally, using $\langle \Delta T \rangle$ in equation (21) to get the travel time ratio (note t=TT) a linearly fit may be done between the ratio versus $\sin^2 \psi$ to obtain the average $\eta$ value over $\Delta Z$ using equation (22).

In one non-limiting example, the above method is demonstrated using the data example in FIG. 7. The VDL images of $\Delta T$ and XCOEF (tracks 4 and 5), and the SH and qSV reflections (tracks 2 and 3) used to calculate them, are displayed for the interval for entire recorded time of 0-14.4 ms. The $\Delta T$ and XCOEF images illustrate respective correspondence; the features on them correspond to reflection locations. The images of the formation bed boundaries, as obtained from migrating the SH reflection data, are also displayed on the right, showing that the average dip of the bed crossing the borehole is about 30°. It should be noted that the dip analysis result of FIG. 6 yields a similar value. This gives an average value of 60° for ϕ, as is needed to calculate equation (24).

Figure 11:
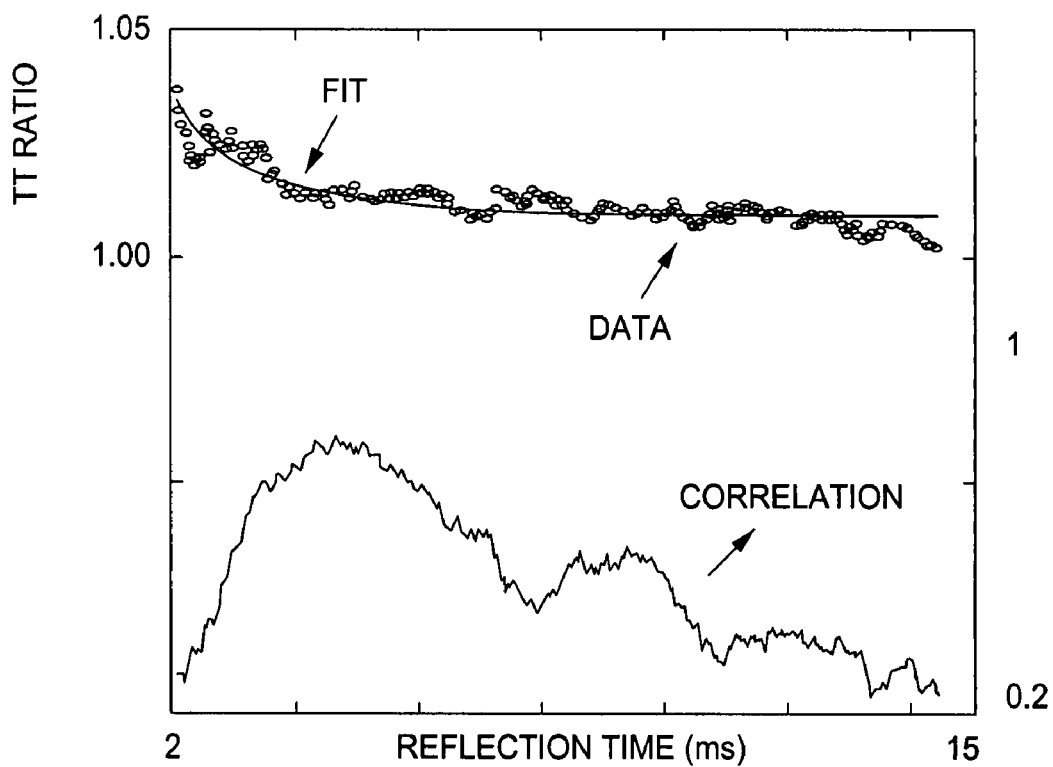
FIG. 11 shows a plot having averaged travel time ratio (circles) and correlation (solid line) data and a lower plot with the ratio data versus $\sin^2 \psi$ and a linear fit of the data.
Figure 11:
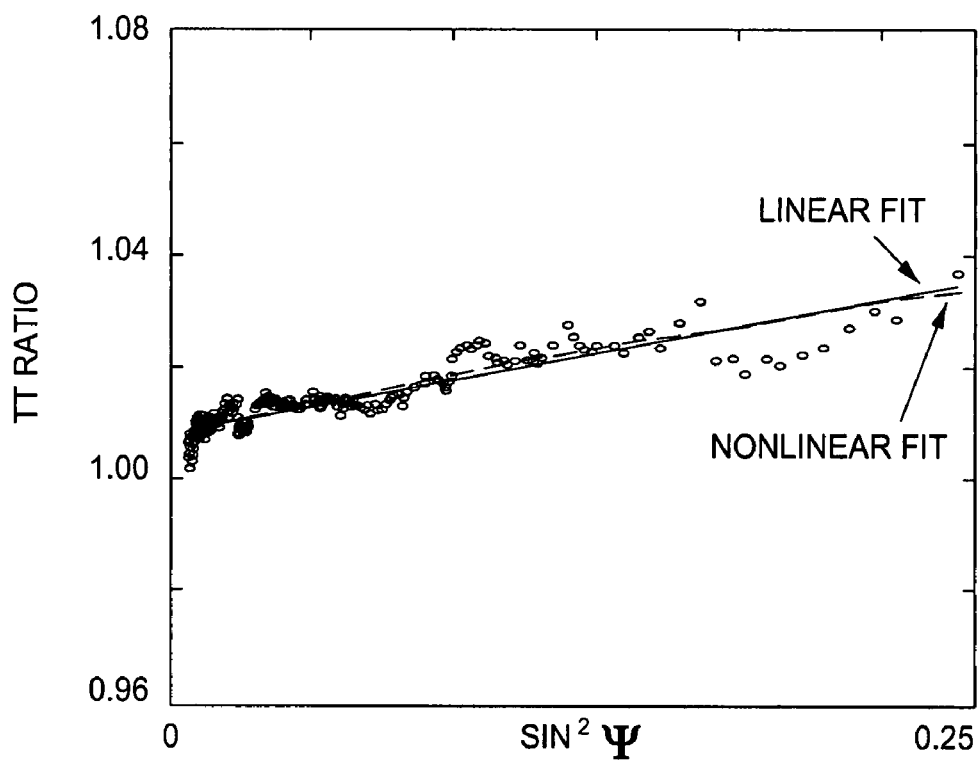

The <ΔT>(t) and XCOEF data after averaging are shown in FIG. 11 (upper plot) for every sampled time interval. Lower plot of FIG. 11 shows the ratio data versus $\sin^2 \psi$ and a linear fit of the data. The slope of the fitted line contains the average value of η. The fitted line in the lower plot corresponds to the fitted curve in the upper plot versus reflection time. The decrease of XCOEF is the result of wave attenuation with traveled distance or time. The corresponding travel time ratio (equation (21)) is plotted versus $\sin^2 \psi$ (lower plot), showing a good linear relationship. The slope of the line fitted to the data is used in equation (22) to calculate η. The same fit versus reflection time is plotted as the solid curve in the upper plot. Note the γ value in this equation is now the average value over the entire displayed depth interval of 300 ft., which is about 0.12. The estimated η value is 0.05, which should be regarded as the average value of the depth interval. The data is also fit with a nonlinear method (dashed curve, to be discussed next). For this small angle (0<ψ<30°) situation, both methods fit the data equally well.

Nonlinear Inversion for Large Angle and Strong Anisotropy—In cases with large incident angles and strong anisotropy, the linear fitting method based on equations (12) may not be adequate and a nonlinear fitting should be used with equations (3) and (6); these relationships are valid for strong anisotropy and large incident angles. At large incident angles, the qSV and SH velocities have a different functional dependence on the angle through the respective anisotropy parameter η and γ (see equations (3) and (6)). It is possible that the qSV to SH velocity ratio can pick up the sensitivity to each individual parameter, whereas in the small angle case the ratio is mainly sensitive to a combination of η and γ (equations (12)). Therefore, data fitting using an inversion method may simultaneously obtain estimates of both parameters.

An obstacle in the nonlinear inversion is that the parameter ε also weakly affects the qSV velocity (see equations (3), where ε−δ=η is an independent parameter and we refer to the ε in the denominator). Inverting this parameter may incur large errors due to its small sensitivity. A solution is to replace ε with γ in the inversion, assuming that the two parameters have about the same magnitude. Or, we can simply set ε=0 and invert only for η and γ. Both approaches should not cause large errors in the inversion result because of the weak ε-dependence of the shear velocity.

Figure 12:
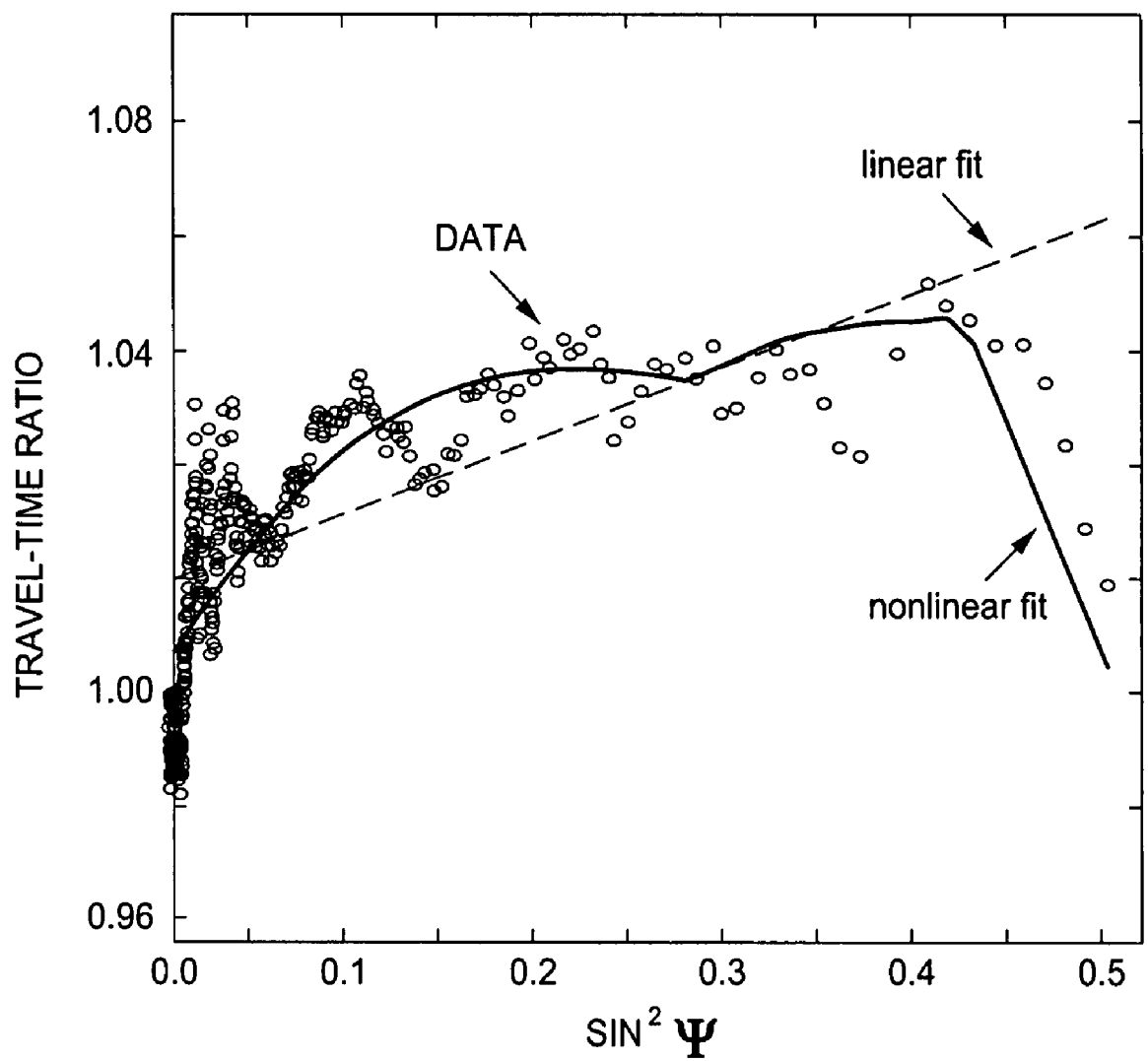
FIG. 12 graphically contrasts a linear fitting approach with a non-linear approach of travel time ratio data to $\sin^2 \psi$.

FIG. 12 is one non-limiting example for the parameter estimation using the inversion method. The travel-time ratio data, plotted versus $\sin^2 \psi$, is the average over a 200-ft sand formation interval using equation (23). The sand formation is sandwiched between two shale formations. The average formation dip angle is 45°. For this large angle range, the data clearly shows a nonlinear trend the can not be fit well with a line (dashed line). Using the inversion method obtains a non-linear fit through the data (solid curve). The anisotropy parameters, specifically for this example, required for the fit are η=0.18 and γ=0.26, respectively. This non-limiting example shows that it is possible to simultaneously invert the two anisotropy parameters when the wave incident angle covers a wide range.

Using P-wave Reflections—The above estimation method using qSV to SH reflections is useful for obtaining anisotropy parameters η and γ. If an additional measurement using P-wave reflections can obtain an estimate of either ε or δ, then the complete set of three Thomsen parameters can be estimated.

The P-to-SH travel-time ratio, as given in equations (11) or (12) (the later is for weak anisotropy and small angles), can be used to provide the additional measurement. A drawback of using the P-to-S wave time ratio, however, is that the P and S reflections associated with a bed reflector need to be identified individually. This would be difficult if there are numerous closely-spaced reflectors. (This is not a problem for qSV and SH waves if their relative time difference is obtained by cross-correlation.) Further, the two types of reflection data may not be processed with the above cross-correlation method due to their significantly different travel time and frequency content. As a result, the averaging method (equation (23)) that is effectively used for qSV and SH reflections is not applicable. Despite the drawbacks, the theory for using the P-to-S time ratio is valid and is ready to be used if favorable P and S reflection data are available.

Processing the wave data as described above may be performed with an analyzer. One specific example of an analyzer is an information handling system (IHS). An IHS may be employed for controlling the generation of the acoustic signal herein described as well as receiving the controlling the subsequent recording of the signal(s). Moreover, the IHS may also be used to store recorded data as well as processing the data into a readable format. The IHS may be disposed at the surface, in the wellbore, or partially above and below the surface. The IHS may include a processor, memory accessible by the processor, nonvolatile storage area accessible by the processor, and logics for performing each of the steps above described.

The present invention described herein, therefore, is well adapted to carry out the objects and attain the ends and advantages mentioned, as well as others inherent therein. While a presently preferred embodiment of the invention has been given for purposes of disclosure, numerous changes exist in the details of procedures for accomplishing the desired results. These and other similar modifications will readily suggest themselves to those skilled in the art, and are intended to be encompassed within the spirit of the present invention disclosed herein and the scope of the appended claims.

What is claimed is:

1. A method of analyzing signal data reflected from a bed boundary comprising:
   obtaining travel time data of a first component of the reflected signal data that is selected from the list consisting of a vertical shear wave component, a horizontal shear wave component, and a compressional wave component;
   obtaining travel time data of a second component of the reflected signal data;
   taking the ratio of said travel time data of the first and second components;
   using the ratio to estimate a formation anisotropic property that is selected from the list consisting of P-wave anisotropy, S-wave anisotropy, a difference parameter, and combinations thereof; and
   extracting a horizontal shear wave component with the following relationship:

$$SH = XX \cdot \cos^2 \alpha + (XY + YX) \cdot \sin \alpha \cos \alpha + YY \cdot \sin^2 \alpha.$$

2. The method of claim 1 wherein the difference parameter corresponds to anellipticity.

3. The method of claim 1 further comprising inducing a signal with a transmitter in a wellbore and receiving the reflected signal with a receiver disposed in the wellbore.

4. The method of claim 1 wherein the second component is selected from the list consisting of a vertical shear wave component, a horizontal shear wave component, and a compressional wave component.

5. The method of claim 1 further comprising obtaining the travel time data of a third wave component from the signal data.

6. The method of claim 5 wherein the third component is selected from the list consisting of a vertical shear wave component, a horizontal shear wave component, and a compressional wave component.

7. A method of analyzing a subterranean formation comprising:
- traversing a downhole tool within a wellbore, wherein the tool comprises a signal transmitter and a reflected signal receiver and wherein a bed boundary is within the subterranean formation;
- inducing a signal into the formation with the transmitter wherein the signal reflects from the bed boundary to create a reflected signal;
- recording the reflected signal with the receiver;
- obtaining travel time information about components of the reflected signal that are selected from the list consisting of a vertical shear wave component, a horizontal shear wave component, and a compressional wave component;
- estimating anisotropic properties that are selected from the list consisting of P-wave anisotropy, S-wave anisotropy, a difference parameter, and combinations thereof of the subterranean formation based on a ratio of the reflected signal component travel times; and
- extracting a horizontal shear wave component with a relationship selected from the list consisting of $SH = XX \cdot \cos^2 \alpha + (XY+YX) \cdot \sin \alpha \cos \alpha + YY \sin^2 \alpha$ and
$qSV = XX \cdot \sin^2 \alpha - (XY+YX) \cdot \sin \alpha \cos \alpha + YY \cdot \cos^2 \alpha$.

8. The method of claim 7 wherein the anisotropic properties comprises a Thomsen parameter.

9. The method of claim 7, wherein the anisotropic properties are selected from the list consisting of Thomson parameters and combinations thereof.

10. The method of claim 8 further comprising cross correlating the reflected signal data.

11. The method of claim 7 wherein the step of estimating anisotropic properties of the subterranean formation is conducted with an information handling system.

12. A method of analyzing signal data reflected from a bed boundary comprising:
- obtaining travel time data of a first component of the reflected signal data that is selected from the list consisting of a vertical shear wave component, a horizontal shear wave component, and a compressional wave component;
- obtaining travel time data of a second component of the reflected signal data;
- taking the ratio of said travel time data of the first and second components;
- using the ratio to estimate a formation anisotropic property that is selected from the list consisting of P-wave anisotropy, S-wave anisotropy, a difference parameter, and combinations thereof; and
- extracting a vertical shear wave component with the following relationship:

$qSV = XX \cdot \sin^2 \alpha - (XY+YX) \cdot \sin \alpha \cos \alpha + YY \cdot \cos^2 \alpha$.

* * * * *